United States Patent [19]
Crum et al.

[11] Patent Number: 5,590,804
[45] Date of Patent: Jan. 7, 1997

[54] DEVICE FOR DRAINING AND STORING ITEMS IN THE VICINITY OF A SINK

[76] Inventors: Donald Crum, 126 College Ave.; Marsha Crane, 818 W. Main St., both of Carlinville, Ill. 62626

[21] Appl. No.: 300,711

[22] Filed: Sep. 2, 1994

[51] Int. Cl.⁶ .................................................. B65D 21/00
[52] U.S. Cl. ........................................ 220/483; 220/23.86
[58] Field of Search ............................. 220/483, 478, 220/429, 23.83, 23.86, 571.1

[56] References Cited

U.S. PATENT DOCUMENTS

| | | |
|---|---|---|
| 587,559 | 8/1897 | Riley . |
| 653,714 | 7/1900 | Thurman . |
| 2,162,887 | 6/1939 | Hart . |
| 3,084,764 | 4/1963 | Duffey et al. ................ 220/483 X |
| 3,187,923 | 6/1965 | Christensen ..................... 220/483 |
| 3,688,943 | 9/1972 | Brown ......................... 220/23.83 X |
| 3,742,965 | 7/1973 | Hudziak ....................... 220/23.86 X |
| 5,108,000 | 4/1992 | Stoll et al. .................... 220/23.86 X |
| 5,279,007 | 1/1994 | Kolada . |

*Primary Examiner*—Steven M. Pollard
*Attorney, Agent, or Firm*—Howell & Haferkamp, L.C.

[57] ABSTRACT

A device for draining and temporarily storing items in the vicinity of a sink includes a bucket and nestable strainer. The bucket has two flexible straps which are secured to the interior of the sink basin by suction cups thereby supporting the bucket and nestable strainer adjacent to the sink basin without interfering with the workable area around the sink. The flexible straps also facilitate emptying any liquid accumulated within the bucket into the sink without loosening the suction cup attachment by first removing the strainer from the bucket and then tilting the bucket over the rim of the sink basin.

19 Claims, 2 Drawing Sheets

DEVICE FOR DRAINING AND STORING ITEMS IN THE VICINITY OF A SINK

BACKGROUND OF THE INVENTION

The present invention relates to a method and device for draining and storing wet and/or soiled items in the vicinity of a sink. Sinks are commonly located in areas where space is at a premium, and, especially in commercial environments, sinks are often used to rinse or cleanse soiled (frequently chemically contaminated) instruments, tools, and utensils.

One such sink is prevalent in hair salons. Hair salons typically utilize single-basin sinks and commonly refer to these single-basin sinks as shampoo bowls. With this single-basin sink, the hair stylist performs a myriad of tasks from simple shampooing and rinsing, to coloring and perming hair. The coloring process requires color bowls, bottles, brushes, and clips to be washed, drained, and dried after each use. Similarly, perm rods and combs need to be washed and sanitized after use. Because space is at a premium in typical salons, instruments used for perming and coloring hair are frequently placed in the sink basin immediately after use. At this point, the instruments are contaminated with residual perm or color solution. It is highly undesirable for the stylist to expose his/her next client to these residual contaminants. Thus, to avoid the risks of cross-contamination or unintentionally exposing a second client to residual perm chemicals or color solution, the instruments must be removed from the sink and the sink must be rinsed before the next shampoo. However, the problem of where to place the soiled instruments remains.

One solution, often used when the stylist is pressed for time, is to simply move the soiled instruments from the sink basin to a nearby shelf or counter. This technique is unsightly, messy, and unsanitary. As mentioned, space surrounding the sink is at a premium which limits the number of items which can be stored therearound and which results in a very cluttered appearance if items are stored therearound. Further, the bowls, bottles, brushes, etc., are frequently wet which may result in contaminated fluids dripping from the shelf or counter, and may leave a soiled residue on shelves and counters. As an alternative, the stylist may wash and rinse the instruments and then place them on nearby shelves/counters. If the stylist diligently washes and rinses the items, this technique is more sanitary. However, this technique is still unsightly and requires the stylist to spend valuable time cleaning instruments during peek business hours. As another alternative, it is possible to place a container on a nearby shelf or on the floor in the vicinity of the sink. However, space constraints require these containers to be quite small which necessitates frequent trips to a central sterilizing/storage location to empty the containers, and the containers are typically too cumbersome to be placed adjacent the sink where they would be in the way of the stylist.

Extension tables and ledges which attach to the rim or ledge of a sink and increase the shelf area around the sink are known in the art. (See U.S. Pat. No. 2,162,887 issued to Hart; and German Patent Publication No. 654,857). However, these items are not equipped to drain soiled or contaminated instruments/tools and require a rim or flange of a particular design to attach them to the side of the sink and therefore lack adaptability for use with various sink configurations. Further, specially designed strainers are also known in the art (See U.S. Pat. No. 587,559 issued to Riley and U.S. Pat. No. 5,279,007 issued to Kolada). These devices are specifically designed to drain tools, instruments, and utensils. However, these devices are designed to support the instruments or tools within the same sink basin that the fluid is draining into, thereby occupying valuable work area within the basin. Further, as with the single-basin shampoo bowls in the hairstyling industry, because an operator must frequently use this single basin at the same time the instruments are draining therein, the problem of cross-contamination is not addressed by these prior art designs.

SUMMARY OF THE INVENTION

The present invention overcomes problems associated with prior art basins and strainers by providing an apparatus and method for draining and temporarily storing soiled or contaminated instruments, utensils, and tools which is adaptable to be conveniently located adjacent any sink basin, occupies minimal space and which does not interfere with the work area within the sink basin. This invention is particularly well suited for the single-basin sinks typically employed in commercial hairstyling salons. In its simplest form, the invention includes a bucket, a removable strainer which is nestable within the bucket, and two flexible straps which extend from the bucket and are mounted to the inside wall of a sink basin by suction cups or another appropriate mounting means. The straps extend over the rim of the sink basin allowing the bucket and strainer to be suspended outside the basin with the rim of the bucket adjacent the rim of the sink, thereby providing a convenient draining and temporary storage device without interfering with the work area within the sink basin. Because the straps are flexible and mount inside the basin, any liquid which accumulates within the bucket from the strainer is easily washed down the sink by removing the strainer and tilting the bucket over the basin rim. The bucket is easily drained without demounting or loosening the straps. A support bar may be employed between the bucket exterior and the sink exterior to facilitate the bucket resting in an upright position.

This design effectively frees the work area within a given sink basin while draining and temporarily storing wet, contaminated tools and instruments. The invention provides a stylist control over when to sanitize the soiled instruments and when the drained contaminants should be washed down the sink. Thus, a stylist may wait until a slow period in the day, when washing the instruments or rinsing the sink will not interfere with servicing his/her clients and when the risk of cross-contamination is at a minimum, before sanitizing the instruments or pouring the contaminated liquid into the sink basin. Moreover, the contaminated liquid is easily poured into the basin without demounting the bucket therefrom. The device is easily adaptable to virtually any sink (i.e. single or multiple-basin sinks) and requires no rim or flange attachment as with several of the prior art designs. Moreover, the present invention requires no support legs and is positionable at several locations around the basin, and the removable strainer facilitates convenient transportion of items to storage or another remote location. Further, the design is well suited for high-speed low-cost plastic manufacturing processes to permit economical production and sale at low cost. Thus, the present invention satisfies a long-felt need by providing a device for draining and temporarily storing items used in the vicinity of single-basin sinks which does not hinder the limited work area within the basin, and which minimizes the risk of chemical contamination, is adaptable to virtually any sink, and is suitable for economical and cost-efficient production.

While the present invention is described as being used in commercial hairstyling, it is also useful in related fields where single-basin sinks are prevalent (i.e. scientific laboratories, hospitals and other health-care facilities, as well as many homes). Further, this invention is equally applicable to multiple-basin sinks where space is at a premium and sanitation is desirable (i.e. commercial kitchens).

While the principle advantages and features of the present invention are briefly described above, a more thorough understanding and appreciation for the invention's advantages and features may be attained by referring to the drawings and descriptions of the preferred embodiment which follows.

DESCRIPTION OF THE PREFERRED EMBODIMENT

Figure 1:
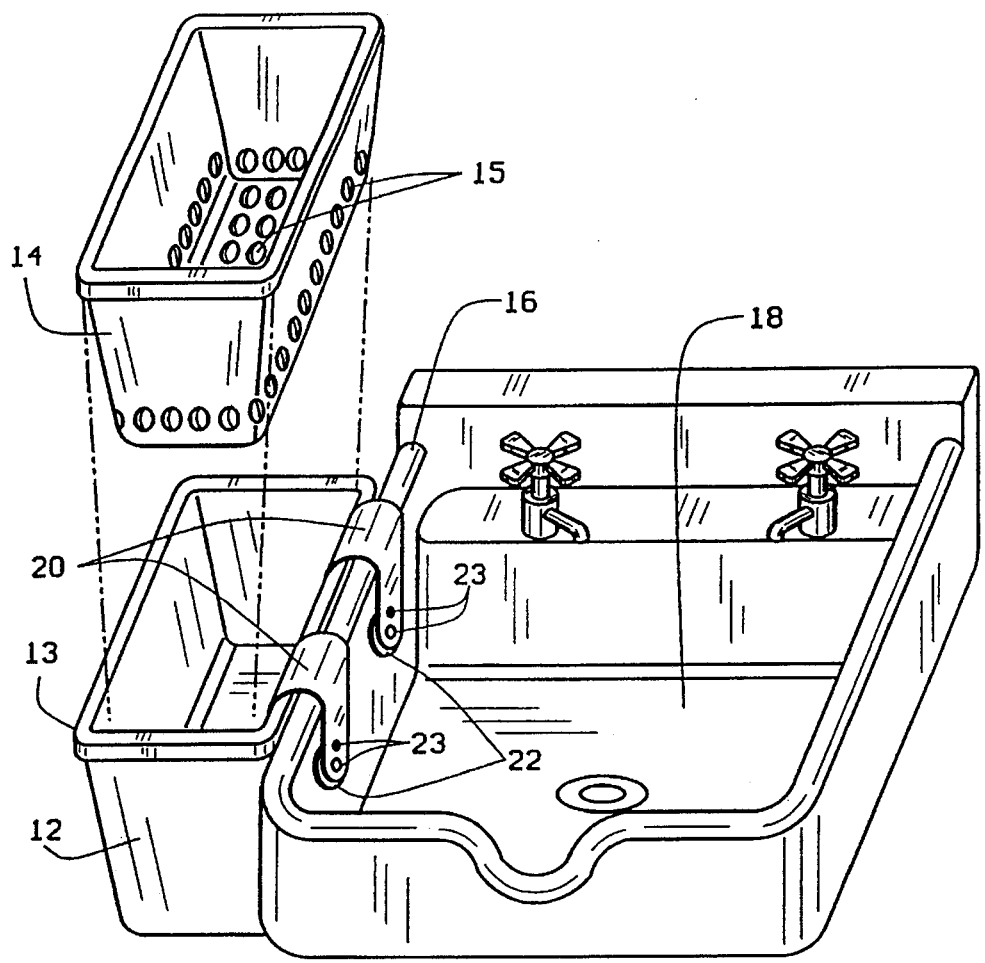
FIG. 1 is an isometric view of the plaintiff's invention illustrating the bucket mounted to a single-basin sink and the nestable relationship between the strainer and the bucket.
Figure 2:
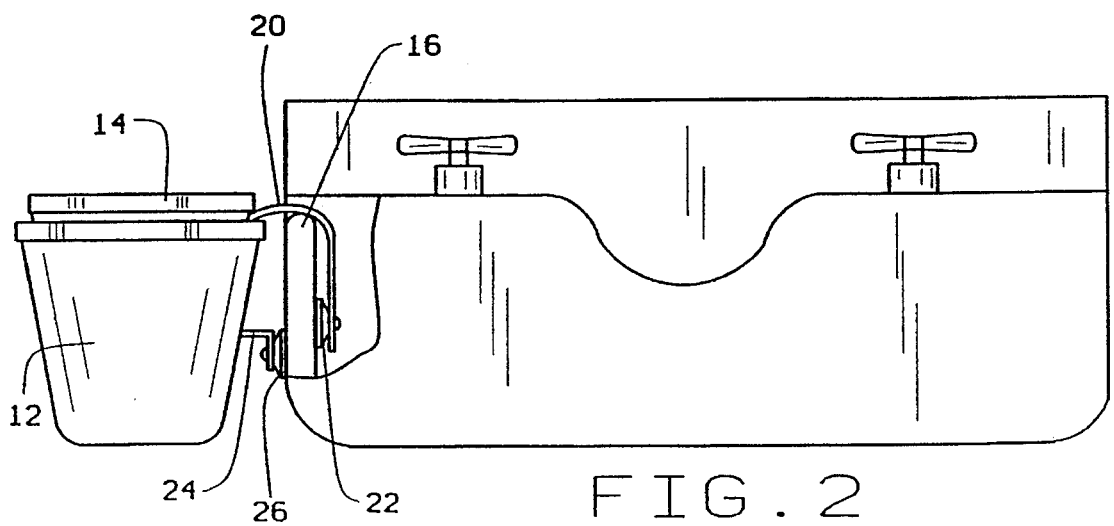
FIG. 2 is a side elevation view illustrating the support bar between the sink and the bucket supporting the bucket and strainer in an upright position.

A device for draining and temporarily storing items in the vicinity of a sink is indicated Generally as 10 in FIG. 1. The device includes a bucket 12, having a top edge 13 therearound, and a strainer 14, having a plurality of apertures 15 therethrough, nestable within the bucket. In the preferred embodiment, the bucket and strainer both have tapered walls. The bucket 12 and the strainer 14 are supported over a rim 16 of a sink basin 18 by two preferably flexible straps 20. In the preferred embodiment, the straps 20 extend from the interior of the bucket 12 and are secured to the interior of the basin 18 by suction cups 22 or another suitable means. The straps 20 have two apertures 23 which allow the suction cups to be positioned at multiple locations along the length of the straps to accommodate different sized basin rims and basins of different depths. As shown in FIG. 2, a support bar 24 extends from the exterior of the bucket 12 and is attached to the exterior of the basin 18 by a suction cup 26 thereby supporting the bucket 12 in a substantially upright position. The term "upright" shall herein refer to the top edge 13 being positioned horizontally with the open end of the bucket 12 facing vertically upward. It is understood that the spacing and length of the straps 20 and the location and length of the support bar 24 may be modified to accommodate different style sinks and to accommodate securing the device 10 at different positions around a given sink.

Figure 3:
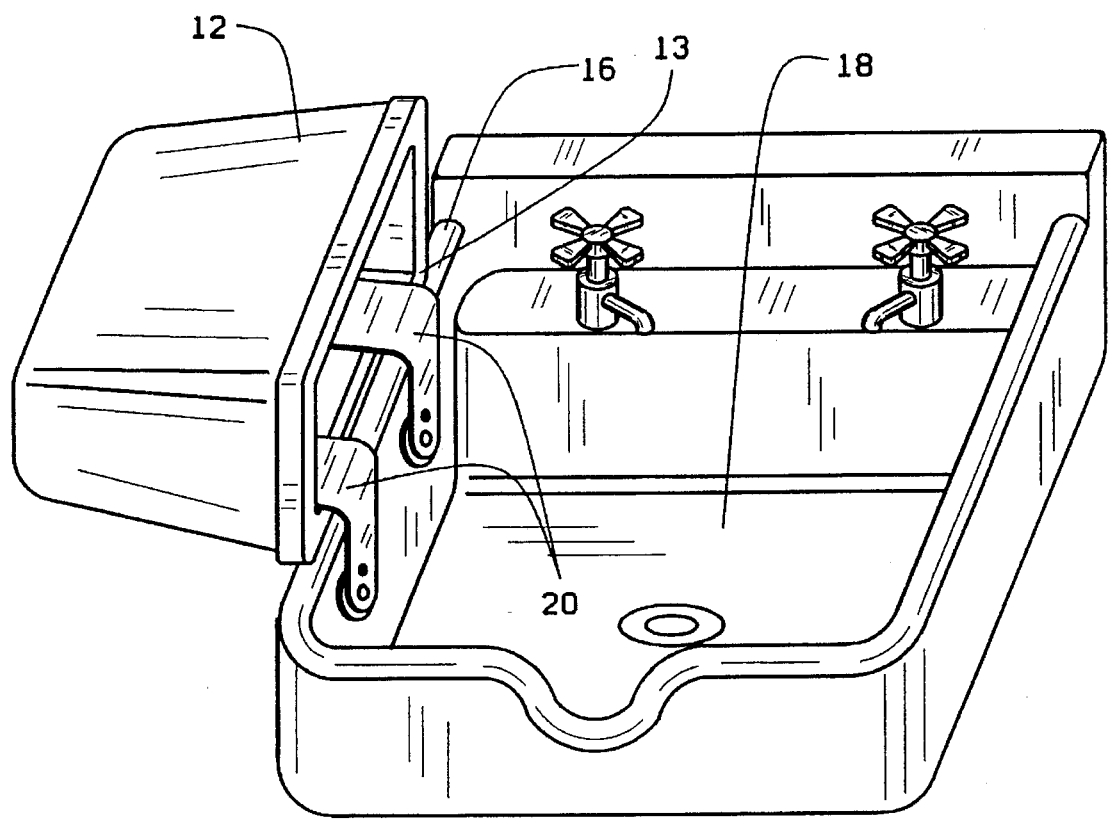
FIG. 3 is an isometric view illustrating the bucket in a tilted position to facilitate pouring liquid into the sink.

In the preferred embodiment, a cavity (not shown) exists between the bottoms of the bucket 12 and the strainer 14 as the bucket and the strainer are nested (as in FIG. 2). This cavity allows any liquid (water, die, perm solution, etc.) remaining on the instruments or tools placed within the strainer 14 to drain through the apertures 15 and into the bucket. As illustrated in FIG. 1, the strainer 14 may be completely removed from the bucket 12. Thus, any liquid remaining in the bucket 12 is conveniently poured into the sink basin 18 by tilting the bucket 12 over the rim 16. (See FIG. 3). The term "tilting" shall herein refer to raising the edge 13 of the bucket 12 over the rim 16 of sink basin 18 and lifting the bucket bottom to a vertical position (or above vertical if needed) thereby allowing the contents of the bucket to flow across the tapered bucket wall and pour into the sink basin 18. The flexible straps 20 allow tilting of the bucket 12 to empty its contents into the basin 18 without loosening the suction cups 22 secured within the basin. It is understood that substantially rigid straps may be employed with a hinge or other pivot means connecting the straps to the bucket without departing from the scope of this invention.

In operation, the hair stylist or another operator selects where to locate the device 10 on a given sink. The suction cups 22 are mated with the appropriate apertures 23 of the straps 20 to accommodate the given sink dimensions and depth. The suction cups 22 are secured to the interior of the basin 18 such that the bucket 12 and nested strainer 14 rest substantially adjacent the exterior of the basin 18 with the bucket edge 13 adjacent the sink rim 16. The support bar 24 is then secured to the exterior of the sink basin 18 by the suction cup 26. Again, the support bar 24 is selected of appropriate size to support the bucket 12 in a substantially upright position.

The size of this bucket and strainer combination, as well as its convenient location adjacent the sink basin 18 allow a soiled or contaminated instrument/tool to simply be placed in the strainer until an appropriate time arrives to sterilize the instrument/tool. Any liquid remaining on the instrument/tool drains into the cavity (not shown) between the bucket and the strainer thereby minimizing any risk of cross-contamination and eliminating the unsightly clutter and residue of the prior art techniques.

In its use, the present invention provides significant advantages over the prior art. The method of using this invention is also novel and unique and includes the steps of mounting the suction cups 22 to the interior of the basin 18 and extending the straps 20 over the basin rim 16 such that the bucket rests adjacent to the sink basin 18 with the bucket edge 13 adjacent the sink-rim 16. In the preferred embodiment, the strainer 14 is nested within the bucket 12 and both are supported in a substantially upright position by the support bar 24. Soiled or contaminated instruments/tools are placed within the strainer 14 to thereby allow any liquid on said items to drain into the bucket. At a convenient time, the operator empties any liquid accumulating in the cavity between the bucket and the strainer by simply removing the strainer and tilting the bucket over the basin rim 16. This design allows a stylist (or other operator) to confine any contaminated instruments/tools in a secure device which is conveniently located adjacent to the sink basin without interfering with the usable area of the basin.

Although illustrated embodiments of the present invention are described herein with reference to the accompanying drawings, it is to be understood that the invention is not limited to those precise embodiments and the various other changes and modifications may be affected therein by one skilled in the art without departing from the scope or spirit of the invention. The scope of the invention and its equivalents are defined solely by the claims, and appended hereto.

What is claimed is:

1. A device for storing items used in and around a sink, said device comprising:

a sink a bucket for holding contents therein, the bucket having a top rim;

a bracket pivotally connecting the bucket to the sink, the bracket being pivotal to enable the bucket to be pivoted between a first substantially upright position outwardly of and adjacent to the sink and a second tilting position in which the top rim of the bucket is elevated entirely over the top rim of the sink so that, in the second tilting position, the contents of the bucket are emptied solely into the sink.

2. The device of claim 1 wherein the bracket includes at least one suction cup attaching the bracket to the sink.

3. The device of claim 2 wherein the suction cup is repositionable on a plurality of locations on the bracket to accommodate different sink depths and top rim sizes.

4. The device of claim 3 wherein the bracket is provided with a plurality of apertures for repositioning the suction cup.

5. The device of claim 1 wherein the bracket comprises a flexible strap, the flexible strap enabling tilting of the bucket over the top rim of the sink with the bucket mounted to the sink.

6. The device of claim 5 wherein the bracket includes at least one suction cup attaching the bracket to the sink.

7. The device of claim 1 wherein the bracket positions the top rim of the bucket adjacent to and substantially level with the top rim of the sink in the first substantially upright position.

8. The device of claim 1 wherein said bracket comprises a pair of flexible straps.

9. The device of claim 1 further including a removable strainer within the bucket.

10. The device of claim 9 wherein the bracket comprises a flexible strap, the flexible strap enabling tilting of the bucket over the top rim of the sink with the bucket mounted to the sink.

11. The device of claim 9 wherein the bracket positions the bucket top rim adjacent to and substantially level with the top rim of the sink.

12. The device of claim 11 further comprising a support bar mounted to the bucket, extending therefrom, and engaging a side of the sink to thereby position the bucket substantially upright.

13. The device of claim 12 wherein bracket comprises two straps and the straps are secured inside the sink by at least one suction cup.

14. The device of claim 13 and further comprising a second suction cup on the support bar attaching the support bar to the exterior of the sink.

15. The device of claim 9 wherein the bracket includes at least one suction cup attaching the bracket to the sink.

16. The device of claim 8 and further comprising a support bar extending from the exterior of the bucket to the exterior of the sink to support the bucket in a substantially upright position.

17. The device of claim 16 and further comprising a suction cup on the support bar attaching the support bar to the exterior of the sink.

18. The device of claim 1 and further comprising a support bar extending from the exterior of the bucket to the exterior of the sink to provide support for maintaining the bucket in a substantially upright position.

19. The device of claim 18 and further comprising a suction cup on the support bar attaching the support bar to the exterior of the sink.

* * * * *